(12) United States Patent
Fournie et al.

(10) Patent No.: US 7,503,524 B2
(45) Date of Patent: Mar. 17, 2009

(54) DEVICE FOR EQUIPPING A HOLE IN A PANEL, AND PANEL THUS EQUIPPED

(75) Inventors: Ludovic Fournie, Toulouse (FR); Jean-Pierre Cabanac, Tournefeuille (FR); Jean-Claude Lacombe, Blagnac (FR)

(73) Assignee: Airbus France, Toulouse (FR)

( * ) Notice: Subject to any disclaimer, the term of this patent is extended or adjusted under 35 U.S.C. 154(b) by 368 days.

(21) Appl. No.: 10/974,537

(22) Filed: Oct. 27, 2004

(65) Prior Publication Data

US 2005/0121554 A1 Jun. 9, 2005

(30) Foreign Application Priority Data

Dec. 4, 2003 (FR) .................................. 03 50975

(51) Int. Cl.
*B64C 1/14* (2006.01)
(52) U.S. Cl. ..................... 244/129.4; 49/501; 49/507; 244/119
(58) Field of Classification Search ............. 244/129.4, 244/119; 52/171.1, 220.8, 514; 49/464, 49/465, 466, 501, 507
See application file for complete search history.

(56) References Cited

U.S. PATENT DOCUMENTS

| | | | | |
|---|---|---|---|---|
| 2,473,616 A | * | 6/1949 | Stephenson | 244/129.3 |
| 2,576,734 A | * | 11/1951 | Voelker | 52/309.2 |
| 3,429,530 A | * | 2/1969 | Heinrich | 244/129.3 |
| 4,669,410 A | * | 6/1987 | Howell | 114/173 |
| 4,858,853 A | * | 8/1989 | Westerman et al. | 244/119 |
| 5,023,987 A | * | 6/1991 | Wuepper et al. | 29/402.11 |
| 5,429,326 A | * | 7/1995 | Garesche et al. | 244/133 |
| 5,491,936 A | * | 2/1996 | Logan et al. | 52/105 |
| 6,443,390 B2 | * | 9/2002 | Bourgon et al. | 244/1 R |
| 6,915,987 B2 | * | 7/2005 | Fisher et al. | 244/129.3 |
| 7,281,686 B2 | * | 10/2007 | Wood | 244/129.3 |
| 2001/0038057 A1 | * | 11/2001 | Palm | 244/119 |

FOREIGN PATENT DOCUMENTS

| | | |
|---|---|---|
| FR | 2 506 405 A | 11/1982 |
| GB | 2 017 857 A | 10/1979 |

* cited by examiner

*Primary Examiner*—Michael Carone
*Assistant Examiner*—Benjamin P Lee
(74) *Attorney, Agent, or Firm*—Patterson, Thuente, Skaar & Christensen, P.A.

(57) ABSTRACT

A removable plate and a flange that occupies a hole in a panel. The flange has the particular feature of taking up compressive force to which the panel is subjected in its plane, perpendicularly to the hole. The weight of the device used to equip the hole is reduced, and the mechanical behavior of the panel at the position of the hole is improved.

21 Claims, 2 Drawing Sheets

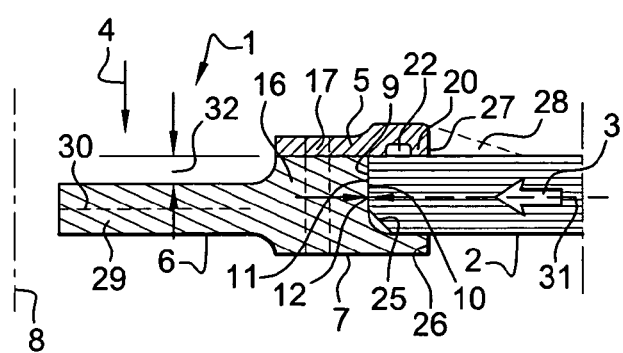
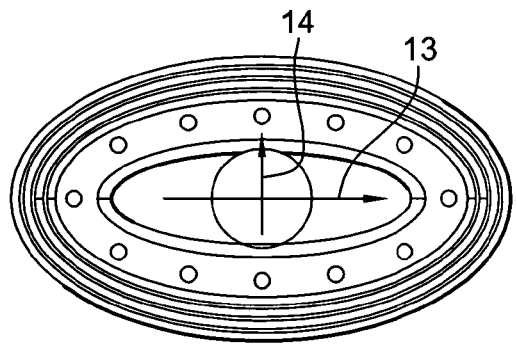
Fig. 1a  Fig. 1b
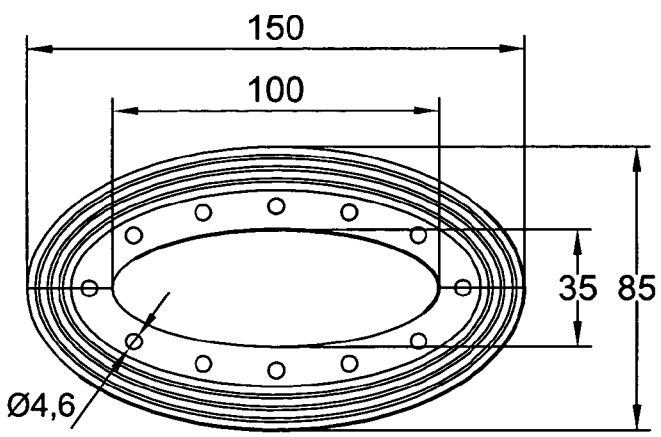
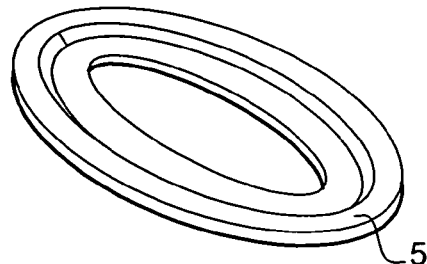
Fig. 2a  Fig. 2b
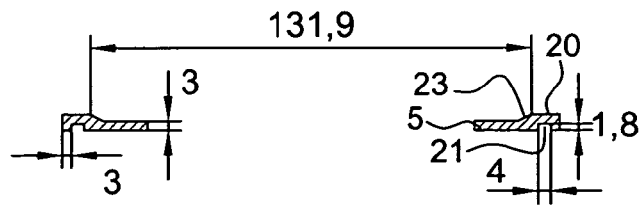
Fig. 4

DEVICE FOR EQUIPPING A HOLE IN A PANEL, AND PANEL THUS EQUIPPED

RELATED APPLICATION

This application claims priority to French Application No. 03 50975 filed Dec. 4, 2003.

BACKGROUND OF THE INVENTION

1. Field of the Invention

An object of the present invention is a device for fitting out or equipping a hole in a panel, especially an aircraft panel, although it can also be used in any other type of structure. It also pertains to a panel thus equipped. The invention seeks to help improve the performance of the panels provided with such holes, whether these holes are made because of an a priori requirement or because of subsequent repairs to the panel.

For the building of structures, especially aircraft, it is the common practice to make panels which are typically panels for the wings and fuselage of an aircraft. For reasons of weight and mechanical hardness, the panels are generally made out of composite materials, typically sheets of carbon fiber and/or sheets of stratified material. In the structure into which this panel is fitted, the panel causes the volumes on one side of the panel to be separated from those located on the other side. It is sometimes necessary to transmit information, or fluids, from one side to the other. It then becomes necessary to make a hole in the panel to enable this passage. In other situations, the panel will have been damaged at a particular place and the deterioration of the material of the panel at this place requires the making of a clean hole, and the fitting out of this hole with a repairing part. In other cases, the hole is simply designed to enable an inspection, in which case it is permanently plugged with a lid that is removed during inspection.

The problem presented by composite materials, especially those working under compression in the direction of the plane of the panel, is that the making of a hole unacceptably burdens the corresponding resistance. In practice, the breaking of such a panel under extreme compression (which is itself far greater than the limit of compression that the panel should undergo during use, especially during flight, as dictated by the JAR and FAR safety coefficients) takes the form of a delamination in the thickness of the panel, and an interpenetration of two parts of this panel subjected to stress at the position of this delamination.

This interpenetration, which is synonymous with breakage, takes place when a hole is made in the panel. It occurs on the one hand approximately facing a diameter of the hole which is perpendicular to the direction of the compression, and on the other hand at a compression value that is very appreciably lower than a borderline value obtained when there is no hole present. In one example, the ratios of these values are about 2 or 3. The weakening caused by the presence of a hole is measured accordingly.

2. Background of the Invention

To overcome this type of problem, there is a known way of reinforcing the panel at the position where the hole is made. It would seem however that this reinforcement entails a complicated operation, especially when stiffeners (separated from one another in practice by a gap of about 20 centimeters) are present at the position of the reinforcement. Besides, once this reinforcement is made, the equipping of the hole, especially in order to place a lid, will itself normally weaken the edges of the hole and therefore contribute to reducing the efficiency of the reinforcement made. In any case, the equipment, especially owing to the presence of the stiffeners, leads to considerable excess weight, especially in the case of aircraft. In a practical example, the holes may have dimensions ranging from some centimeters to 20 centimeters.

SUMMARY OF THE INVENTION

In the invention, the idea used to resolve this problem adopts a different procedure. Rather than making a reinforcement and a standard lid for the hole, it is planned to make a rigid flange-like element that gets engaged in the hole and is supported by its edges on the edges of the panel at the position of the hole. The compression forces are therefore transmitted by contact between the composite panel and the flange. Then, especially when the compression is exerted, this flange serves to take up the compression force. The consequence of this is that the composite panel at the position of the hole thereafter deteriorates only at far greater forces, in practice about 30% higher than the equivalent forces obtained when the hole has been reinforced in the classic way. It will be shown here below that the flange which, in practice, is made of aluminum or any other even more rigid metal or material, helps prevent an increase in the weight of the panel at the position of the hole, and furthermore dispenses with the need for drilling holes otherwise made in the lateral reinforcement of the periphery of the hole to enable the installation of the lid. The flange can thus be been made of any other material, especially a composite material.

The invention therefore has the effect of improving the structural behavior of the panel under compression and having a hole. This improvement is obtained by the positioning of a flange by contact, this flange residing in the hole.

An object of the invention is a device for equipping a hole in a panel of a structure, especially an aircraft, the panel, especially a back side, being liable to undergo a compressive force in a direction perpendicular to a direction of the hole, wherein the device comprises:

at least one first removable plate, and held on this first plate, a flange occupying the hole, this flange fulfilling a role of taking up compression force, by a contact on an edge of the hole, the first plate and the flange comprising fins to be mounted by clamping on the panel, the flange being provided with perforations at the position of a peripheral reinforcement piece supported against the edge of the hole, attachment screws being engaged in these perforations.

An object of the invention is also a panel fitted out with a device of this kind.

BRIEF DESCRIPTION OF THE DRAWINGS

The invention will be understood more clearly from the following description and the accompanying figures. These figures are given purely by way of an indication and in no way restrict the scope of the invention. Of these figures:

FIGS. 1a and 1b show a view in section and a top view respectively of the device for equipping a hole according to the invention;

FIGS. 2a, 2b and 3a, 3b respectively represent dimension drawings and drawings in perspective of a plate and flange of the device of the invention;

FIG. 4 and FIG. 5 are views in section of the plates and flange of FIGS. 2a and 3a respectively.

DETAILED DESCRIPTION OF THE INVENTION

Figure 3A:
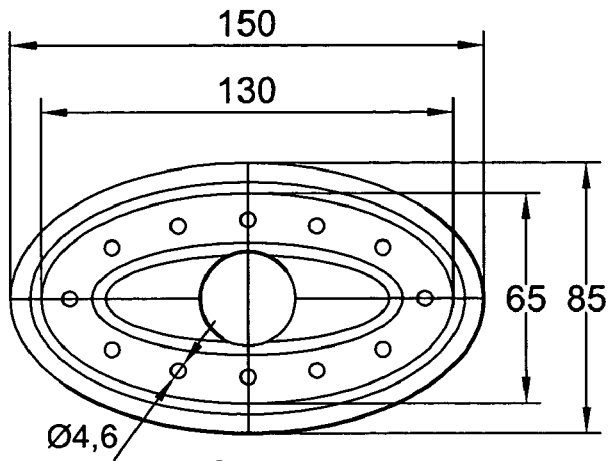

FIG. 1a shows a device for the equipping of a hole according to the invention. This device is designed to equip a hole 1 made in a panel 2. The panel 2 is a panel of any unspecified structure; in particular, the panel 2 is a panel made of composite material for an aircraft. The panel 2, in the invention, is liable to be subjected to a compression force 3 in the plane of the panel. The direction of the force 3 is substantially perpendicular to a direction 4 of the hole 1. At most, a divergence of a few degrees may arise owing to a slight buckling of the panel 2. In the invention, the device for equipping the hole 1 comprises at least one first detachable plate 5 and a flange 6 that occupies the hole 1. In a preferred variant, the plate 6 is fixedly joined with a fin 7 used to hold the panel 2 clamped, but without any excessive compression. It is also possible to envisage making the fin 7 detachably, like the plate 5.

In one example, the plate 5, the flange 6 and/or the independent fin 7 have a shape generated by revolution about an axis 8 passing through the center of the hole 1 (when it is circular).

The taking up of the compressive force 3, at the position of a contact 9 between an edge 10 of the panel 2, and an edge 11 of the flange 6, can be obtained by limiting the clearance 12 of insertion of the flange 6 in the panel 2 to the maximum extent. In one example, the insertion of the flange into the hole is done by force-fitting. In other words, in a preferred variant, this clearance is in the range of about $\frac{1}{10}^{th}$ of a millimeter and this clearance is naturally closed, when the force 3 is applied, by a shifting of the edge 10 toward the edge 11. Since the flange 6, when it is in the hole 1, is very rigid, it provides for the continuity of the transmission of the force in such a way that the maximum stress limit of the panel 2 vertical to the hole 1 will be far greater than the stress limit values obtained with classic type reinforcement pieces and, in practice, will be of the same order or even greater than the stress limit of the panel alone, without any hole or because of other types of rupture (buckling, impact damage or the like).

FIG. 1b shows that, preferably, the hole 1, the plate 5 and the flange 6 are oval-shaped with a big axis 13 perpendicular to a small axis 14. The big axis 13 is collinear with the expected direction 3 of compression. As compared with a round hole with an axis 8, the oval hole of FIG. 1b can be obtained with a milling cutter of the type used in industry. This milling cutter will follow an elliptical path or oval path and can be used to obtain the 0.1 millimeter clearance indicated here above.

It will be noted that the making of the hole-equipping device in two parts at least, the plate 5 and the flange 6, or even three parts, namely the plate 5, the flange 6 which is internal only and the attached fin 7 makes it easy to mount all these parts on the hole and keep them on either side of the panel 3. The fixed attachment of the plate 5 to the flange 6 can be obtained by any means. In particular the flange 6, at the position of a peripheral reinforcement piece 16 on itself, may be provided with perforations 17 facing equivalent perforations on the plate 5 so that attachment screws to fasten the plate 5 to the flange 6 may be engaged therein. When the flange 6 is provided with its integrated fin 7, the perforations 17 may themselves be threaded so as to eliminate the need for a nut on the other side of the flange. In the diagrammatically represented example, the fixed attachment is obtained by 12 screws. The bigger the hole 1, the greater will be the number of screws. The flange 6 can be held on the first plate 5 also by bonding or soldering.

As a variant, the flange 6 may be provided with a threaded tip rising along the axis 8 perpendicularly to the plane of this flange 6, on that side of the flange 6 which is opposite the side bearing the fin 7. In this case, the plate 5 may take the form of a large nut, screwed on to this threaded tip. The large nut itself has an external diameter that is sufficient to take support in reaction against the other side of the panel 2. If need be, a washer with a large external diameter is placed between the large nut and the panel 2. The large nut, or the large nut and this washer, form the plate 5 of the invention.

FIGS. 2a and 3a indicate the dimensions of the plate 5 and flange 6 respectively. The dimensions are given in millimeters. In a particular embodiment, the oval-shaped hole 1 made in the panel will have a size of 130 mm for the big axis and 65 mm for the small axis, that is, a ratio between the diameters or between the radii of curvature that is preferably equal to 2. This ratio is a preferred ratio should the direction of compression force 3 be known. If this ratio is lower, the effects of the invention, while being significant, are not optimized. If it is greater, greater effects are expected. However in this case, for an aircraft, problems of feasibility may be encountered, given the space requirement entailed in the making of the hole 1 in the panel.

Figure 3B:
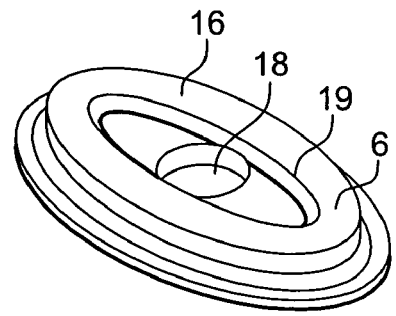

When the flange 6 itself has a passage hole 18, FIG. 3b, it has an inner edge 19 of the reinforcement piece 16, which too has the shape of an ellipse whose big axis is 100 mm and whose small axis is 35 mm. In this example, the overall dimensions of the plate 5 and of the flange 6 are 150 mm along the big axis and 85 mm along the small axis. In the example, the perforations 17 made in the reinforcement piece 16 have a diameter of 4.8 mm. In this example, the central hole 18 has a diameter equal to 30 mm.

Figure 5:
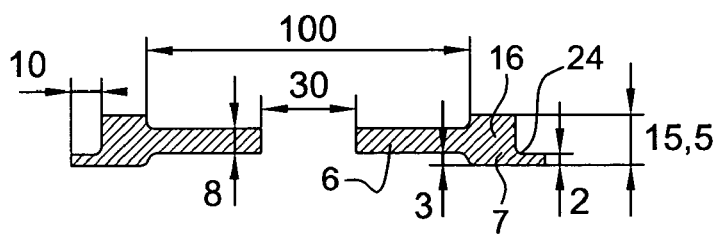

FIGS. 4 and 5 give the dimensions, in section, of the plate 5 and flange 6. The plate 5, FIG. 4, thus forms a spacer. It comprises a flat part with a thickness of 3 mm that is supported on the reinforcement piece 16. Beyond the edge 11 of the flange 6, and hence beyond the external edge of the reinforcement piece 16, the plate 5 has a fin 20 of greater thickness, for example a thickness of 5 mm. The rigidity of the fin 5 is therefore increased at the place where this fin projects beyond the reinforcement piece 16. The fin 20 is designed to take support on a face of the panel 3, while the fin 7 of the flange takes support on the other part. When the flange 6 is fixedly attached to the plate 5, the panel 2 is held by clamping. In one variant, the fin 20 is provided with a groove 21 that is 4 millimeters wide and 1.8 millimeters deep. An elastomer seal 22 was placed on this groove to provide for the tight sealing of the assembly. A seal of this kind can also be mounted on the flange 6. The fin 20 is joined to the plane part of the plate 5 by a fillet 23, which are example is rounded.

With regard to the flange 6, provided with its fin in its preferred version 7, its overall thickness is 15.5 millimeters, and the thickness by which the fin 7 goes beyond on the other side of the face of the panel 3 is 3 millimeters, given the fact that no joint is made at this place. The fin 7, which forms a single piece with the flange 6, is connected to the reinforcement piece 16 by a rounded fillet 24. The fillet 24 is aimed at simplifying manufacture. It entails the making of a chamfer 25 to receive it on the panel 3. This chamfer is made when the hole 1 is made.

It is also possible to plan for the making in the panel 3 of rabbets or recesses to receive the ends 26 and 27 of the fins 7 and 5 respectively. In this case, the making of these rabbets would have to be such that preferably, the compression forces 3 applied to the panel 2 would be applied also to these edges 26 and 27. If it is not sought to make such rabbets and if, furthermore, for aerodynamic reasons it is sought to limit the effects of turbulence prompted by the raised presence of the fins 5 or 7, it may be planned to make a mastic seal 28 after the mounting of the assembly.

FIG. 1a furthermore shows that, to the extent that the reinforcement piece 16 is deployed throughout the height of the edge 12, the shutter part 29 of the hole 1, circumscribed by this reinforcement piece 16, does not extend throughout this height. The thickness is smaller. The reason for this is simple: since the material of the device equipping the hole is more rigid than the composite material and is made of aluminum or titanium for example, it does not need to be as thick. This gives a gain in weight.

In one example, furthermore, rather than centering the neutral axis 30 of the shutter part 29 in the alignment of the neutral axis 31, in the middle of the panel 2, it may be preferred to make it undergo a shift equal to half of a distance 32. The distance 32 corresponds to the shift of the respective surfaces of the panel 2 and of the shutter part 29. Indeed, the fixing of the fin 7 to the flange 6, in the preferred case when they are single-piece units, has the consequence wherein the buckling will tend rather to occur in the direction going from the plate 5 to the fin 7. This means that it is preferable to shift or offset the neutral axis 30 toward the fin 7. To simplify manufacture, this offset is equal to half of the reduction 32 in the thickness of the shutter zone 29 relative to the thickness of the panel 2 and hence the thickness of the reinforcement piece 16.

In another case, with this thickness being smaller than the flange 6, it was found to be preferable to place the neutral axes in the alignment of each other, without any offset. The neutral axis of the flange 6 is then placed on the middle of the two faces of the panel.

The invention therefore is particularly promising when the hole made in the panel is subjected to a compression force. In particular, this is the case for an extrados or back surface of a wing or of the fuselage.

Figure 6:
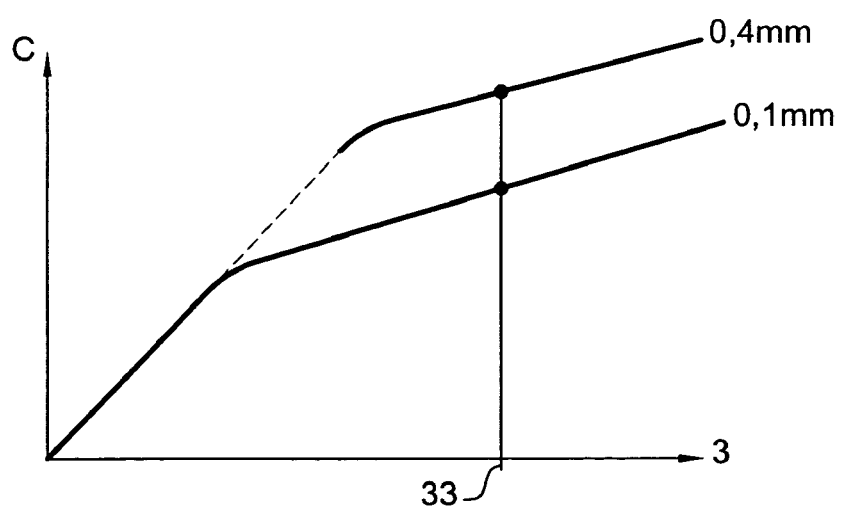
FIG. 6 is a force graph showing the effects of the invention.

FIG. 6 is a graph giving a schematic view of the compressive stress C undergone by the panel 2 vertically to the small axis 14, as a function of the force 3 applied. It clearly shows that if the clearance in the making of the reinforcement piece 16 relative to the edge 10 of the hole 1 is equal 0.1 mm, then, for a same force 33, the stress exerted on the panel will be smaller than it is when the clearance is greater, i.e. 0.4 millimeters. On the practical plane, with the milling machine used to cut out the hole 1, it may be planned to make a small clearance, typically equal to 0.1 mm. However, it can also be planned to make a bigger clearance, for example equal to 1 mm and to close this clearance by means of flexible shims, made of aluminum for example, with a thickness of 0.9 mm or the like. These shims can be placed at the same time as the flange 6 gets engaged in the hole 1, or in any case before the positioning of the fin 5. As a variant, this clearance may be closed by means of a liquid that solidifies.

What is claimed is:

1. A device for reinforcing a panel of an aircraft structure, wherein the panel presents a panel plane, the panel further presenting a panel first face, an opposed panel second face, a panel thickness extending between the panel first face and the panel second face, and structure defining a panel hole and a panel hole edge extending the panel thickness transverse to the panel plane, the device being removably engageable with the panel at the panel hole, the device comprising:

a plate including a plate section and a plate fin; and
a flange removably coupled to the plate, the flange including
a flange section having a flange section thickness being less than said panel thickness, and receivable within the panel hole and engageable with the panel hole edge,
a flange fin oriented radially outwardly from the flange section, and
a peripheral reinforcement portion intermediate the flange section and the flange fin, wherein the peripheral reinforcement portion is positioned substantially flush against the panel hole edge, the peripheral reinforcement portion being adapted to absorb a compressive force from the panel hole edge, the peripheral reinforcement portion presenting a peripheral reinforcement portion thickness being greater than said flange section thickness,
wherein the plate fin is oriented relative to the plate section and the flange fin is oriented relative to the flange section such that the plate fin abuts the panel first face, and the flange fin abuts the opposed panel second face such that the flange fin and plate fin clampingly engage the panel when the device is removable engaged with the panel at the panel hole.

2. The device according to claim 1, wherein the flange of the device occupies the hole of the panel with a minimum clearance that is filled by the deformation of the panel when it is subjected to compression, such as when the aircraft is in flight.

3. The device according to claim 1, wherein the panel hole comprises an oval shape and the compressive force is collinear with a major axis of the panel hole.

4. The device according to claim 3, wherein the ratio of the major axis of the hole to a minor axis of the hole is two.

5. The device according to claim 1, wherein the flange section further defines a hole.

6. An aircraft panel reinforced with the device according to claim 1.

7. The aircraft panel according to claim 6, wherein the panel is synthetic resin.

8. The aircraft panel according to claim 6, wherein the panel is formed by composite materials.

9. The aircraft panel according to claim 6, wherein the panel is formed by a sheet of carbon fibers.

10. The aircraft panel according to claim 6, wherein the panel is formed by a sheet of stratified materials.

11. The device according to claim 1, wherein the flange section is adapted to take up force, and wherein the flange section weaker than the panel, and is placed in the middle of the two faces of the panel.

12. The device according to claim 1, wherein at least one of the plate fin and the flange fin includes a seal.

13. The device according to claim 1, wherein the plate fin is coupled to the plate by a fillet joint.

14. The device according to claim 1, wherein the flange fin is coupled to the peripheral reinforcement portion of the flange by a fillet joint.

15. The device according to claim 1, wherein the flange section is adapted to take up force, and wherein flange section is weaker than the panel and is offset towards one of two faces of the panel.

16. The device according to claim 1, wherein the removable plate and the flange of the device are made of aluminum, titanium, or composite material.

17. The device according to claim 1, wherein the flange of the device is operably coupled to the removable plate by screwing or bonding.

18. The device according to claim 1, wherein the panel comprises a rabbet at the position where at least one of the removable plate and the flange are mounted thereto.

19. The device according to claim 1, wherein the peripheral reinforcement portion comprises structure defining perforations having attachment screws engaged therein, thereby removably coupling the flange to the plate.

20. A system for reinforcing a panel of an aircraft structure, the system comprising:
- a panel presenting a panel plane, the panel further presenting a panel first face, an opposed panel second face, a panel thickness extending between the panel first face and the panel second face, and structure defining a panel hole and a panel hole edge extending the panel thickness transverse to the panel plane;
- a plate including a plate section and a plate fin, the plate fin being operably coupled to the first face of the panel at the panel hole edge; and
- a flange removably coupled to the plate, the flange including
  - a flange section having a flange section thickness being less than said panel thickness, and received within the panel hole and removably engaged with the panel hole edge,
  - a flange fin oriented radially outwardly from the flange section and operably coupled to the opposed panel second face, and
  - a peripheral reinforcement portion intermediate the flange section and the flange fin, wherein the peripheral reinforcement portion is positioned substantially flush against the panel hole edge, the peripheral reinforcement portion being adapted to absorb a compressive force from the panel hole edge, the peripheral reinforcement portion presenting a peripheral reinforcement portion thickness being greater than said flange section thickness wherein the plate fin is oriented relative to the plate section, and the flange fin is oriented relative to the flange section such that the plate fin abuts the panel first face, and the flange fin abuts the opposed panel second face such that the flange fin and plate fin clampingly engage the panel when the device is removably engaged with the panel at the panel hole.

21. The system according to claim 20, wherein the peripheral reinforcement portion comprises structure defining perforations having attachment screws engaged therein, thereby removably coupling the flange to the plate.

* * * * *